United States Patent [19]

Scott, Jr.

[11] 3,904,343
[45] Sept. 9, 1975

[54] MOLD FOR TACKING AN HEXAGONAL BUNDLE OF GLASS FIBERS

[75] Inventor: Russell J. Scott, Jr., Palo Alto, Calif.

[73] Assignee: Varian Associates, Palo Alto, Calif.

[22] Filed: May 10, 1971

[21] Appl. No.: 141,532

[52] U.S. Cl. ............... 425/472; 249/157; 249/161; 425/330
[51] Int. Cl.² ......................................... B28B 7/02
[58] Field of Search .................. 249/157, 156, 161; 425/330, 450, 472; 250/207; 18/DIG. 5

[56] References Cited
UNITED STATES PATENTS
| | | | |
|---|---|---|---|
| 595,274 | 12/1897 | Soper | 249/156 X |
| 3,271,502 | 9/1966 | Wentorf | 425/330 X |

FOREIGN PATENTS OR APPLICATIONS
| | | | |
|---|---|---|---|
| 933,658 | 8/1963 | United Kingdom | 18/DIG. 5 |

OTHER PUBLICATIONS

Fiber Optics, Kapany, N.S., Academic Press, 1967, pp. 125–128.

Primary Examiner—Robert D. Baldwin
Attorney, Agent, or Firm—Stanley Z. Cole; D. R. Pressman; Harry E. Aine

[57] ABSTRACT

A mold for tacking an hexagonal bundle of glass fibers, such as those utilized in the fabrication of microchannel electron multiplier plates is disclosed. The mold includes a generally channel-shaped base member having longitudinally directed sides upstanding from a flat base. A plurality of longitudinally directed angle blocks are movable within the channel for defining, with the flat base surface, the flat sides of an hexagonal bundle of glass fibers. The blocks are adjustable to compensate for dimensional variations of the individual fibers such that the resultant tacked bundle has dimensions which are accurately controlled and in which the fibers are accurately positioned with the fibers tacked together without producing undue distortion of the individual fibers within the bundle.

6 Claims, 2 Drawing Figures

PATENTED SEP 9 1975                     3,904,343

INVENTOR.
RUSSELL J. SCOTT JR.
BY
Leon F. Herbert
ATTORNEY

MOLD FOR TACKING AN HEXAGONAL BUNDLE OF GLASS FIBERS

GOVERNMENT CONTRACT

The invention herein described was made in the course of a contract with the department of the U.S. Army.

DESCRIPTION OF THE PRIOR ART

Heretofore, a mold for tacking an hexagonal bundle of glass fibers has been constructed and used in production. This prior mold included a base plate having a pair of transversely spaced longitudinal grooves therein to receive a pair of side plates, each having a longitudinally directed 120° V-shaped groove facing inwardly of the side members. Each of the V-shaped grooves defined two flat sides of the hexagonal bundle of fibers to be tacked within the mold. The land portion of the base structure between the longitudinal grooves defined the bottom flat of the hexagonal bundle of fibers and a cover plate similar to the base plate had a land portion defining the upper flat surface of the hexagonal bundle. The plates were adjustable, one relative to the other by means of shims placed between the members.

A problem with the prior art tacking mold was that shimming, to account for dimensional variations of the individual fibers, was a tedious complex operation and did not provide the necessary degrees of adjustment to fully compensate for all the dimensional variations. As a result, uniform pressure between each of the glass fibers to be tacked was not obtained resulting in improper tacking, whereby the yield in manufacture of microchannel plate electron multipliers was undesirably low. In the process for making the microchannel plate electron multipliers of the type disclosed in U.S. Pat. No. 3,128,408, additional glass drawing and tacking steps are employed and a dimensional instability in the first tacked hexagonal bundle is multiplied in the successive glass drawing steps.

SUMMARY OF THE PRESENT INVENTION

The principal object of the present invention is the provision of an improved mold for tacking an hexagonal bundle of glass fibers.

In one feature of the present invention, a channel-shaped mold structure is provided having a pair of side members upstanding from a base portion having a flat horizontal base face intermediate the sides. A longitudinally directed angle block is transversely movable within the channel to define the width of the base face and to define one lower side face of the hexagonal bundle of fibers to compensate for dimensional variations in the individual fibers.

Another feature of the present invention is the same as the preceding feature wherein a pair of angle blocks are inserted within the channel along opposite side edges of the channel to define the two additional upper side faces of the hexagonal bundle. These angle blocks are movable parallel to adjoining lower side faces of the hexagonal mold. Another angle block is interposed between the upper pair of angle blocks for defining the top flat surface of the hexagonal bundle, whereby uniform pressure is exerted between all of the fibers in the bundle to assure uniform tacking without distortion of the individual fibers.

In another feature of the present invention, a screw means is provided for adjusting the position of the lower side angle block within the channel, whereby precise positioning of the angle block is readily obtained.

Other features and advantages of the present invention will become apparent upon a perusal of the following specification taken in connection with the accompanying drawings, wherein:

DESCRIPTION OF THE PREFERRED EMBODIMENTS

Figure 1:
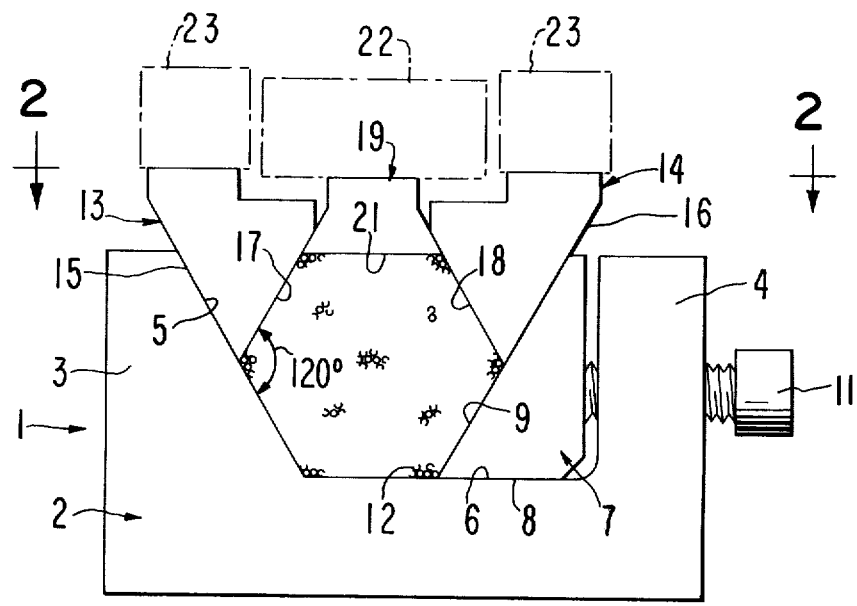
FIG. 1 is an end view of a tacking mold incorporating features of the present invention.
Figure 2:
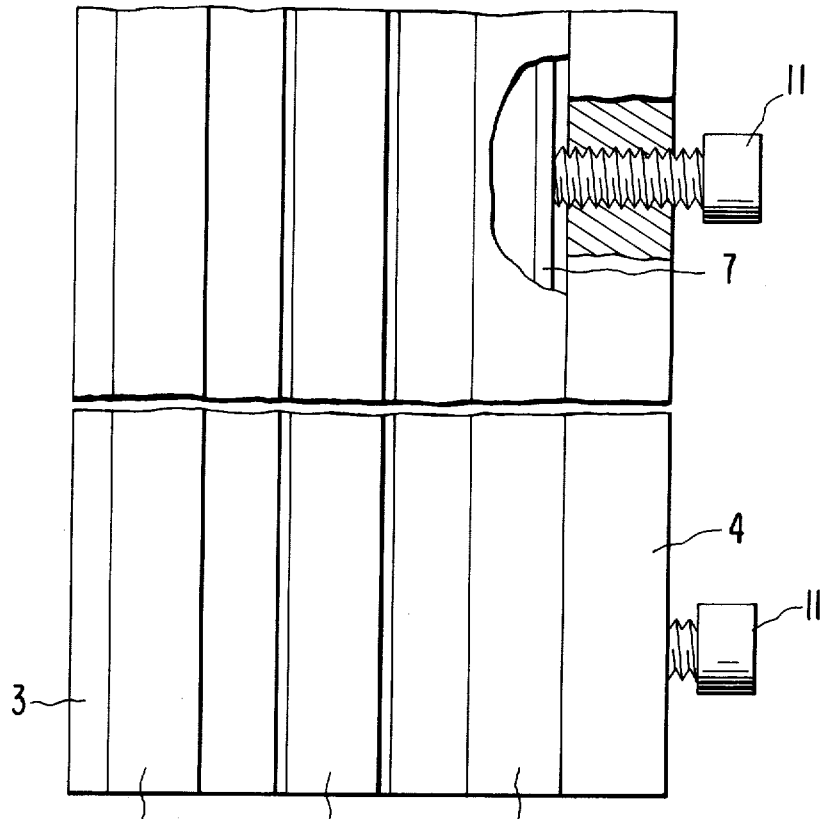
FIG. 2 is a view of the structure of FIG. 1 taken along line 2—2 in the direction of the arrows, partly broken away, to show the screw adjustment means.

Referring now to FIGS. 1 and 2 there is shown a mold 1 for tacking an hexagonal bundle of glass fibers and incorporating features of the present invention. The tacking mold 1 includes a unitary rigid channel member 2, as of carbon. The channel member 2 has sufficient length to accommodate the length of the bundle of fibers to be tacked. In a typical example, the channel 2 is 14 inches long, has a height of 2.25 inches and a width of 4 inches. The channel includes a pair of upstanding side portions 3 and 4. In a typical example, side 4 has a wall thickness of 0.75 inches and the base of the channel has a thickness of 0.75 inches, whereas the left side 3 of the channel has an inside face portion 5 inclined at 120° to the horizontal face 6 of the inside surface of the base to define the lower left side face of the hexagonal bundle.

A first angle block 7, as of carbon, is inserted longitudinally of the channel 2 along the right side 4 thereof. The first angle block 7 includes a lower horizontal face 8 riding in slideable engagement with the upper face 6 of the base 2. The first angle block also includes an inner face 9 inclined at 120° to the base face 6. In a typical example, the first angle block 7 has a height of 1.5 inches and a width at its base of 1 inch.

A plurality of adjusting screws 11, as of carbon, are inserted through tapped holes passing through the right side 4 of the channel 2. The inner ends of the adjusting screws 11 bear against the vertical face of the first angle block 7 for adjusting the transverse position of the first angle block 7 within the channel and to adjustably control the width of the base face 6 which is to receive the lower row of glass fibers 12 to be tacked and to define the lower horizontal face of the hexagonal bundle.

Thus, faces 5, 6 and 9 define the lower left side face, base face, and lower right side face, respectively of the hexagonal bundle of glass fibers to be inserted within the mold.

In a typical example, the first row of glass fibers 12 comprises 29 fibers of a nominal diameter of 0.0299 ± 0.0002 inches. The first row of fibers is inserted within the channel and the adjusting screws 11 are adjusted for an interference fit such that the fibers, which are of circular cross section, are each touching each other in the first row and the end fibers are tangent and touching the side faces 5 and 9 of the mold 1. Additional rows of fibers 12 are then stacked into the mold in a close packing configuration until 29 rows of such fibers have been stacked.

At this time, a pair of longitudinally directed second and third angle blocks 13 and 14, respectively, are inserted along the upper left and right sides of the channel 2 within the channel mold 2. The second and third angle blocks 13 and 14 each include an outer face 15 and 16 which rides in slideable engagement upon the faces 5 and 9, respectively, of the mold. In addition, the angle blocks 13 and 14 each include an inner face 17 and 18, respectively, for defining the upper left and right side faces, respectively, of the hexagonal bundle. Faces 17 and 18 are disposed at 120° relative to faces 5 and 9, respectively. Blocks 13 and 14 are made of carbon and, in a typical example, have a height of 1.25 inches, and a width of 1.125 inches. The fibers 12 are then stacked in 28 additional closely packed rows.

A fourth longitudinally directed angle block 19 is interposed between the upper blocks 13 and 14. Angle block 19 includes a lower face 21 which is horizontal and parallel to base face 6 which bears against the upper row of the hexagonal bundle of fibers for defining the upper surface of the hexagonal bundle. In a typical example, the upper angle block 19 is made of carbon with a width of face 21 dimensioned in accordance with the desired width of the respective face of the hexagonal bundle to be tacked. The outwardly flared sides of the upper block 19 are substantially parallel to faces 17 and 18 of the side blocks 13 and 14, respectively, and the upper block 19 has a width at its top of nine-sixteenths inch.

After the fibers 12 have been packed into the hexagonal mold 2, weights are placed upon the respective blocks 13, 14 and 19 to produce a uniform pressure between all of the fibers within the hexagonal bundle. More particularly, in a typical example, a one-fourth to one-half pound weight 22 is positioned on top of the top block 19, whereas 1 pound weights 23 are positioned on the top of each of the side blocks 13 and 14.

The packed tacking mold 1 is then inserted into a tacking furnace and elevated to a temperature of approximately 565°C in a nitrogen atmosphere to produce tacking between each of the adjacent fibers within the hexagonal bundle. After the fibers have been tacked, the mold 2 is allowed to cool and the bundle is removed.

In the manufacture of microchannel plate electron multipliers, each of the glass fibers 12 includes a core glass portion, such as Schott glass LAK-3 available from United Lens Company of Connecticut, which is clad on the outside with lead glass, such as 8,161 obtainable from Corning Glass Company. The tacking temperature and pressure is sufficient to tack the lead glass clad fibers 12 without substantial distortion.

In subsequent manufacturing steps of the microchannel plate electron multiplier, the hexagonal glass fiber bundles are drawn to substantially reduce the cross sectional dimensions. The drawn hexagonal fibers are then loaded into another hexagonal mold of the type shown in FIGS. 1 and 2 and tacked together and drawn again. In a subsequent step, the core glass is etched leaving a honeycomb arrangement of glass tubes which are then used as a subassembly in a micro-channel plate electron multiplier.

The advantage to the use of the tacking mold 1 of the present invention, is that the adjustments of the angle blocks 7, 13, 14, and 19 compensates for dimensional variations in the individual glass fibers, whereby precise dimensional control is obtained and whereby a more uniform pressure is obtained between fibers during the tacking step to obtain a more uniform tacking of all of the fibers within the hexagonal bundle.

I claim:

1. In a mold for tacking a bundle of glass fibers into a composite bundle of hexagonal cross section, a channel means having first and second transversly spaced longitudinally directed sides upstanding from a base portion, said base portion having a flat horizontal base face facing upwardly between said upstanding sides to define a first face of the hexagonal bundle, means within said channel and extending along said first upstanding side thereof for defining a flat second face of said hexagonal bundle in a plane inclined at an angle of 120° to said first horizontal base face, said second face facing generally towards said second side of said channel, first means disposed within said channel and extending along said second side thereof and having a third flat face in a plane inclined at an angle of 120° to said first horizontal base face for defining a third face of the hexagonal bundle, said third face facing generally toward said first side of said channel, means for transversely translating said first means in the horizontal direction, second and third means extending longitudinally of said channel means, along opposite sides thereof, each of said second and third means having fourth and fifth flat faces facing into said channel and each inclined at an angle of 120° to said first horizontal base face and being parallel with said aforementioned third and second faces, respectively, to define fourth and fifth faces of the hexagonal bundle, said second and third means being translatable in directions parallel to said aforementioned second and third faces, respectively, and fourth longitudinally directed means interposed between said second and third means and having a horizontal sixth face facing into said channel to define the sixth face of said hexagonal bundle, and said fourth means being vertically translatable.

2. The apparatus of claim 1 wherein said means for defining said second flat face comprises a portion of said first upstanding side of said channel means.

3. The apparatus of claim 1 wherein said means for translating said first means comprises a pair of adjusting screws passing through said second side of said channel means.

4. The apparatus of claim 1 wherein said second and third means include respective faces disposed in slideable engagement with said second and third flat faces.

5. The apparatus of claim 1 wherein said channel, first, second, third and fourth means are all made of carbon.

6. The apparatus of claim 1 wherein said channel means comprises a rigid unitary member.

* * * * *